United States Patent [19]

Kane

[11] Patent Number: 4,712,974
[45] Date of Patent: Dec. 15, 1987

[54] PART POSITIONING APPARATUS AND METHOD

[75] Inventor: Peter E. Kane, Westwood, Mass.

[73] Assignee: Polaroid Corporation, Cambridge, Mass.

[21] Appl. No.: 747,841

[22] Filed: Jun. 24, 1985

[51] Int. Cl.$^4$ .............................................. B65G 47/24
[52] U.S. Cl. ..................... 414/757; 29/468; 29/DIG. 46; 198/394; 414/754; 414/780; 414/786
[58] Field of Search ............ 29/DIG. 46, 468; 193/2 B, 44; 198/382, 394, 383, 384; 209/538, 920; 414/754, 757, 758, 768, 770, 780, 781, 786, 784, 777

[56] References Cited

U.S. PATENT DOCUMENTS

| | | | |
|---|---|---|---|
| 2,250,518 | 7/1941 | Ashlock, Jr. | 198/384 |
| 2,725,971 | 12/1955 | Clark-Riede | |
| 2,807,350 | 9/1957 | Rayburn et al. | |
| 3,061,070 | 10/1962 | Smith | 198/384 |
| 3,503,527 | 3/1970 | Devol | 414/758 X |
| 3,868,759 | 3/1975 | Hartleroad et al. | 29/464 |
| 3,881,605 | 5/1975 | Grossman | 414/754 X |
| 4,079,830 | 3/1978 | Winberg et al. | 198/391 |
| 4,305,130 | 12/1981 | Kelleg et al. | 414/730 X |
| 4,425,075 | 1/1984 | Quinn | 414/755 |
| 4,436,479 | 3/1984 | Belloli | 414/757 |
| 4,457,664 | 7/1984 | Judell et al. | 414/779 |

Primary Examiner—Robert J. Spar
Assistant Examiner—Janice Krizek
Attorney, Agent, or Firm—John S. Vale

[57] ABSTRACT

A part positioning apparatus is provided for accurately positioning and angularly orienting a variety of different parts or components for pick-up by a robotic part handling device. The apparatus includes a bowl-like part receptacle which is subjected to a vibratory force so that a part placed on a concave interior surface of the receptacle slides thereover, under the influence of gravity, and assumes an equilibrium position in a designated area of a horizontal plane thereby positioning the part with respect to X and Y axes. Thereafter the receptacle is rotated about a vertical axis to angularly orient the part in a desired direction.

17 Claims, 6 Drawing Figures

PART POSITIONING APPARATUS AND METHOD

BACKGROUND OF THE INVENTION

The present invention relates to the field of automated manufacturing apparatus and, more specifically, to a part positioning apparatus and method for manipulating a small part or component of a product to place it in a desired position and orientation in preparation for a subsequent product assembly operation.

In the interest of improving efficiency and reducing costs, programmable robotic part-handling devices are being incorporated into automated production lines. The appeal of a robotic device is that it can be programmed to do various tasks and it does not have to be dedicated to a particular product assembly. Thus, a robotic device may be viewed as a generic type of automated manufacturing tool that does not become obsolete when the product or manufacturing process changes.

In one type of product assembly operation, a robotic part-handling device picks up a part and places it on the assembly. Generally, the part must be precisely positioned and oriented at a pick up station for a robotic device to successfully grasp it and transfer it to the assembly.

To further reduce manufacturing costs, it is highly desirable to provide a generic part positioning apparatus that can be used with a variety of different parts rather than having to provide a dedicated machine or tool that is limited to handling only one particular part.

One type of generic part positioning apparatus known in the art comprises a turntable having a part supporting stage thereon which is movable in two directions along X and Y axes. A part to be picked up by a robotic device is placed on the stage which is moved in the X and Y directions to locate the part in a desired pick up area or zone in a horizontal X-Y plane. Then, the turntable is rotated about a vertical axis centered in the pick up area until the part achieves a desired angular orientation $\theta$ or direction in the plane for pick up. Generally, this type of apparatus employs a vision system or photodetector array for sensing the X, Y and coordinates of the part. This information is fed to a computer based control system which automatically operates the linearly movable stage and turntable. Typically, a large amount of data has to be generated and processed during the course of the position sensing and adjustment cycle which tends to make the control system complex and expensive. Also, the X-Y stage mechanism is expensive because it requires highly accurate and repeatable actuators or drivers for precisely adjusting the locations of the various movable components. For a representative example of this type of positioning apparatus, reference may be had to U.S. Pat. No. 4,457,664.

Thus, there is a need for a positioning apparatus that is generic in nature, i.e., it may be used with a variety of different parts without substantial modification, and is less complex than the relatively expensive type of positioning apparatus described above that uses a movable X-Y stage mounted on a turntable.

As will be described later in detail, the present invention provides a generic type of part positioning apparatus which includes a specially shaped part receptacle that is subjected to a vibratory force for facilitating movement of a part therein to a designated area in a horizontal plane. The use of vibratory force to move or facilitate movement of a part for positioning and/or orientation purposes is known in the art. However, this method generally is employed in conjunction with a dedicated part positioning apparatus that is specifically designed for a particular part. For representative examples of such apparatus, see U.S. Pat. Nos. 4,436,479; 4,079,830; 3,868,759; 2,807,350, and 2,725,971.

Therefore, it is an object of the present invention to provide a part positioning apparatus that may be used with a variety of different parts yet is simple in its construction and is easy to use.

Another object is to provide such a part positioning apparatus which eliminates the need for a linearly movable X-Y stage to locate a part in a designated area of a horizontal plane.

Yet another object is to provide such a part positioning apparatus which positions a part with respect to X and Y axes and rotates the part to provide a desired angular orientation $\theta$ or direction.

Still another object is to provide such a part positioning apparatus which may be used to position and orient a part for pick up by a robotic part handling device.

Other objects of the invention will, in part, be obvious and will, in part, appear hereinafter.

SUMMARY OF THE INVENTION

The present invention provides a part positioning apparatus for locating a part within a designated area of a horizontal plane and for, thereafter, rotating the part about a vertical axis centered in the designated area to angularly orient the part in a desired direction. Typically, the positioning apparatus would be used in an automated product assembly line to accurately position and orient the part for pick up by a robotic part handling device.

The apparatus includes a hollow bowl-like part receptacle which is disposed so that the designated area of the horizontal plane is centered therein. The interior of the receptacle is defined by an upwardly facing, smooth, concave part supporting surface over which a part placed thereon will tend to move or slide, under the influence of gravity, downwardly and toward the center of the receptacle to seek an equilibrium position within the designated area.

To insure that the part will freely slide over the interior surface, the apparatus includes means for vibrating the receptacle, preferably up and down in the direction of the vertical axis. The vibration is applied for a selected time and acts to reduce frictional forces between the concave surface and the part thereon and thereby facilitate movement of the part to the equilibrium position within the designated area.

The positioning apparatus further including means for selectively rotating the receptacle about the vertical axis to angularly orient the part at the equilibrium position in the desired direction.

The positioning apparatus is generic in nature in that the vibrating receptacle effective for positioning a variety of differently shaped parts with respect to X and Y axes in a horizontal plane and does not have to be custom designed or modified for a particular part.

The concave shape of the interior surface of the receptacle in combination with the friction reducing vibration causes the part to settle into an equilibrium position wherein the center of gravity of the part is lowest-most within the receptacle and is typically aligned with the vertical axis about which the receptacle is rotated for angular orientation.

A part having a complex asymmetrical shape may settle into an equilibrium position wherein it is upside down or otherwise disposed so that it may not be correctly oriented by turning the receptacle. To correct this situation the part positioning apparatus may optionally further include a reorientation device for receiving a part transferred thereto from the receptacle and for rotating the part through a selected angle about a horizontal axis to place the part in its correct orientation. A method for positioning and angularly orienting a part utilizing the bowl-shaped receptacle is also provided.

BRIEF DESCRIPTION OF THE DRAWINGS

For a fuller understanding of the nature and objects of the present invention, reference may be had to the following detailed description taken in connection with the accompanying drawings wherein.

DESCRIPTION OF THE PREFERRED EMBODIMENT

Figure 1:
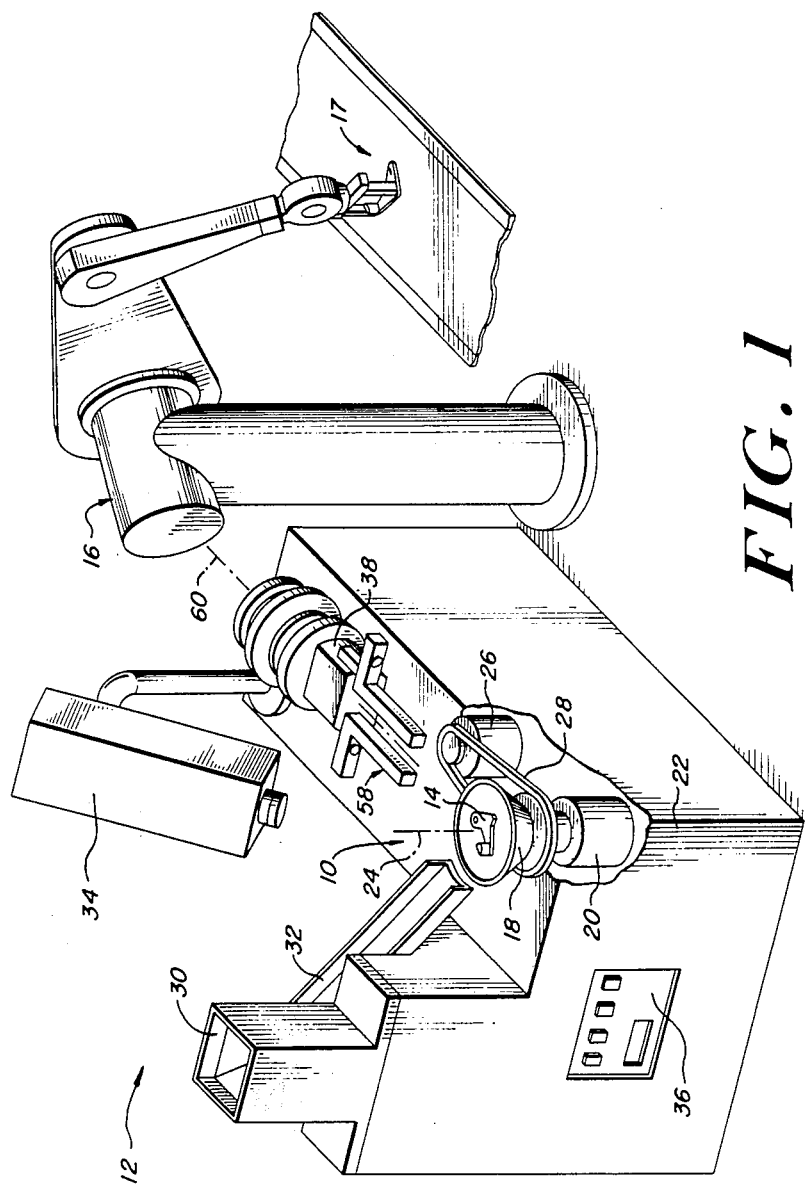
FIG. 1 is a perspective view of a part positioning apparatus embodying the present invention shown forming part of an automated part handling and product assembly system.

The present invention provides a part positioning apparatus 10 which is shown in FIG. 1 in its intended environment forming part of an automated part handling and product assembly system 12.

The primary function of apparatus 10 is to receive a part or component 14 of a product assembly from a supply of randomly oriented parts 14 and to locate it in a predetermined position and orientation for pick up by a robotic part handling device such as the illustrated programmable robotic pick up arm 16 which also forms part of system 12. Typically, robotic arm 16 is programmed to pick up a part 14 from apparatus 10 and transfer it to a product assembly area diagrammatically illustrated at 17.

The part positioning apparatus 10 is simple in its construction and includes a specially configured bowl or dish shaped part receptacle 18 which is located on top of a base unit 20 mounted on a frame 22 for supporting various components of system 12. The base unit 20 mounts receptacle 18 for rotation about a central vertical axis 24 and also includes a vibratory energy source therein which is operable to apply a vibratory force to receptacle 18 along axis 24. As will become apparent later, by vibrating receptacle 18, a part 14 therein will automatically seek and move to a designated area in a horizontal plane thereby providing the desired X-Y position for pick up by robotic arm 16.

Once the part 14 is positioned with respect to the X and Y axes, the receptacle 18 is rotated about axis 24 to provide the desired angular orientation θ. For this purpose, apparatus 10 is provided with means for rotating receptacle 18 about the central vertical axis 24, such as the illustrated electrical motor 26 that is coupled by a drive belt 28 to a later to be described rotatable shaft mounting receptacle 18 thereon.

The illustrated system 12 additionally includes means for feeding randomly oriented parts 14 in sequence into receptacle 18. Apparatus 10 additionally includes means for sensing the position and angular orientation of a part 14 in receptacle 18; and means for controlling the operaton of the various components of apparatus 10 so that they work together in a coordinated manner.

The means for feeding parts 14 to positioning apparatus 10 may include any of a variety of suitable part feeding mechanisms or systems that are well known in the art. For the purpose of illustration, randomly oriented parts 14 are provided one at a time from a supply hopper 30 and are transported to apparatus 10 by a conveyer 32 which drops the part into receptacle 18 through its open top end. Alternatively, the parts 14 could be delivered to receptacle 18 by a vibrating bowl-type part-feeding device that is commonly used in automated production lines.

The means for sensing the position and orientation of a part 14 in receptacle 18 may take the form of an electronic vision system which converts an optical image or representation of a part 14 in receptacle 18 into electronic signals that are indicative of X-Y position and angular orientation. The vision system sensor may take the form of the illustrated video camera 34 or, alternatively, the sensor may take the form of a matrix array of photodetectors that measure the level of reflected light from part 14 and the surrounding interior surface of receptacle 18 to provide position and orientation data signals.

The means for controlling and coordinating the operation of various above described components of apparatus 10 may take the form a computer based programmable controller or control system diagrammatically illustrated in FIG. 1 at 36. Controller 36 also may be configured to control the operation of the robotic arm 16 and the part feeding mechanism, or it may operate under the supervision of a host computer that controls the various components of system 12 in a manner well known in the art.

Optionally, apparatus 10 also may include a part reorientation device, such as the diagrammatically illustrated pneumatic part gripping and rotating device 38. Device 38 is adapted to receive a part 14 from robotic arm 16 after pick up and to rotate it about a horizontal axis through one of a plurality of selected predetermined angles for remedial orientation purposes if necessary. After such reorientation, the robotic arm removes the part from device 38 and transfers it to the product assembly area 17.

The shape characteristics of any particular part 14 will determine whether or not reorientation may be necessary. If the part 14 is symmetrical so as not to have an upside down state after it has been positioned and angularly oriented within the confines of receptacle 18, then reorientation will not be necessary. If, however, the part is asymmetrical and it may assume an upside down state, or more than one improper orientation state, in receptacle 18, then, reorientation would be required before the part 14 was transferred to the product assembly area 17.

Figure 2:
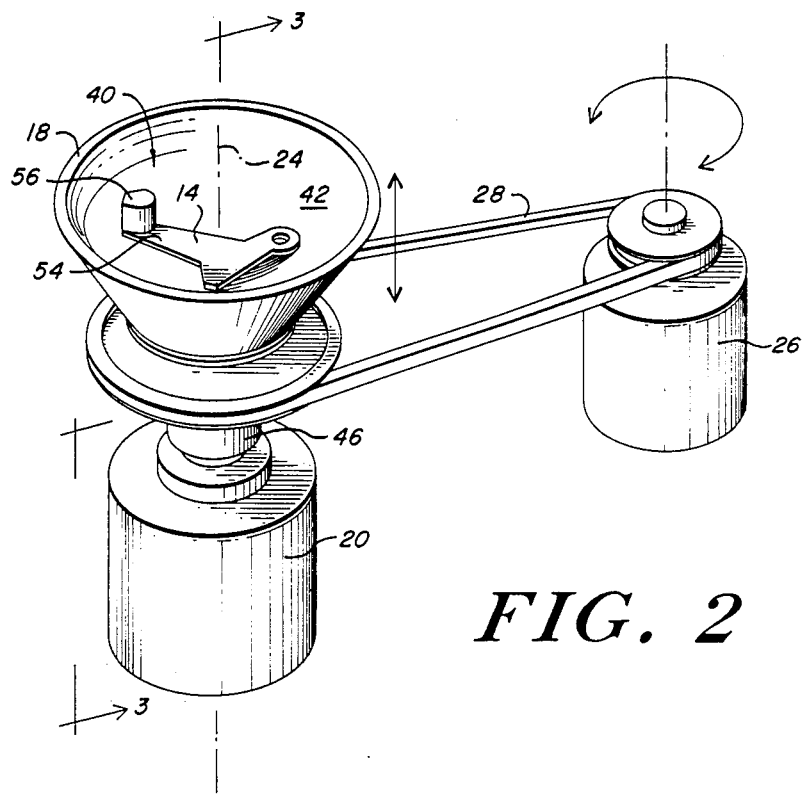
FIG. 2 is a perspective view of a part receptacle assembly forming part of the part positioning apparatus.
Figure 3:
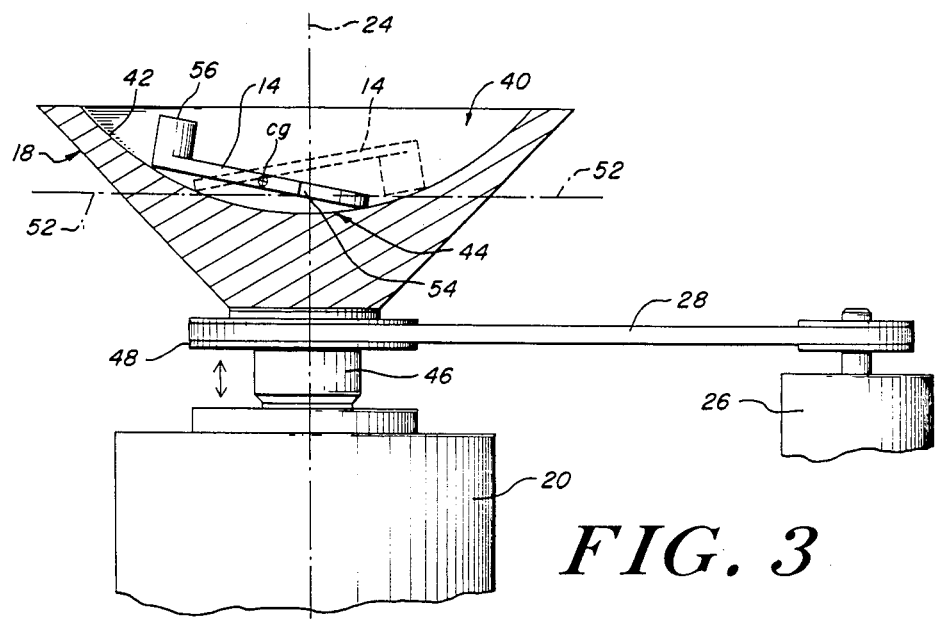
FIG. 3 is a side elevational view, partly in section, of a portion of the assembly of FIG. 2 taken along lines 3—3 and showing a part in the receptacle at an initial position.

With reference to FIGS. 2 and 3, the part receptacle 18 of apparatus 10 is a hollow bowl or dish shaped member that has a top opening 40 and an upwardly facing interior concave part supporting surface 42 which is preferably a surface of revolution about vertical axis 24 centered at the closed bottom end 44 of receptacle 18.

The bottom end 44 of receptacle 18 is fixedly secured to the upper end of a vertical shaft 46 that projects outwardly from the upper end of vibratory base unit 20. Shaft 46 is mounted in base unit 20 for rotation about a vertical axis that is concentric with axis 24. It is also mounted for limited linear translation in the axial direction for transmitting a vertically directed vibratory force, applied to the lower end of shaft 46 by a vibratory source (not shown) in base unit 20, to the part receptacle 18. A sheave or pulley wheel 48 is fixedly attached to shaft 46 for receiving the drive belt 28 which connects the motor 26 in driving relation to shaft 46 for rotating receptacle 18 about axis 24.

Figure 5:
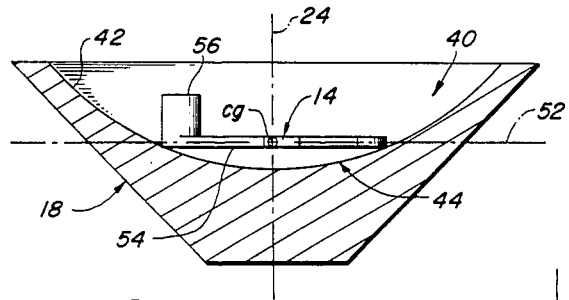
FIG. 5 is similar to the receptacle portion of FIG. 3 but shows the part at an equilibrium position within a designated area of a horizontal plane.

In the illustrated preferred embodiment, the concave interior surface 42 of receptacle 18 has the shape of a segment of the interior surface of a hollow hemisphere. That is, it is a surface of revolution generated by revolving a segment of a circle, which intersects axis 24 at one end thereof, about axis 24 to define the open top and closed bottom receptacle 18. Thus, as shown in FIGS. 3 and 5, the vertical cross section of surface 42 is an upwardly opening segment of a circle that is symmetrically disposed with respect to the vertical axis 24.

While the illustrated concave interior surface 42 of receptacle 18 is a segment of a hemisphere, it should be understood that other types of surfaces of revolution may be used to define surface 42. For example, the curve that is revolved about axis 24 to define surface 42 may be a segment of a parabola, ellipse, or other curve that is smooth and predominantly concave.

The receptacle 18 may be more generally described as being open at the top end and including an upwardly facing generally concave interior surface of revolution 42 which diminishes from a maximum diameter near the top end to a minimum diameter at the closed bottom end. Preferably, the maximum diameter at the open top end is at least 25 to 50% larger than the longest dimension of part 14 to provide the necessary clearance for easily introducing a part 14 into receptacle 18 and to insure that the part will descend down into receptacle 18 far enough so as not to be ejected by the vibratory force.

Surface 42 is made concave so that a part 14 placed thereon will tend to slide or move over surface 42, under the influence of gravity, downwardly and toward the center of receptacle 18 to seek an equilibrium or stabilized position wherein the center of gravity of the part is as low as possible. To reduce friction between part 14 and surface 42, and thereby enhance sliding movement, it is preferable that surface 14 be smooth and hard.

To insure that the part 14 will freely slide down into receptacle 18 over surface 42 to seek an equilibrium position, it is necessary to further reduce and minimize the frictional force between the part and the concave surface 42. In apparatus 10, this is done by vibrating the receptacle 18 for a selected time up and down in the direction of the vertical axis 24 by applying a vertically directed vibratory force to the shaft 46 with the vibratory source in base unit 20 which is operated by controller 36. The vibratory source may take the form of any suitable commercially available electro-magnetic vibrator which is typically driven by A.C. line voltage to produce 60 hertz oscillations, although vibration frequency is not deemed to be particularly critical.

The vertical vibratory motion of receptacle 18 causes the part 14 to bounce up and down slightly with respect to the part supporting surface 42. This, in effect, periodically provides a very low friction air cushion between the part and surface 42 which minimizes friction facilitates sliding motion of the part 14 under the influence of gravity toward an equilibrium position.

As best shown in FIGS. 3-6, the base unit 20 mounting receptacle 18 is positioned so that a designated circular robotic arm part pick up area 50 in a horizontal plane 52 is located within receptacle 18 with the vertical axis 24 at the center of the designated area 50. When a part 14 is located within the designated area 50, it is correctly positioned in terms of X and Y coordinates for pick up by the robotic arm 16.

The size of the designated area 50 and the height of the horizontal plane 52, in which area 50 lies, above the bottom 44 of concave surface 42 will vary for different sized parts. That is, parts that are relatively small compared to the maximum diameter of surface 42 at the upper end of receptacle 18 will descend further down into the receptacle to settle at the equilibrium position than will larger parts.

Figure 4:
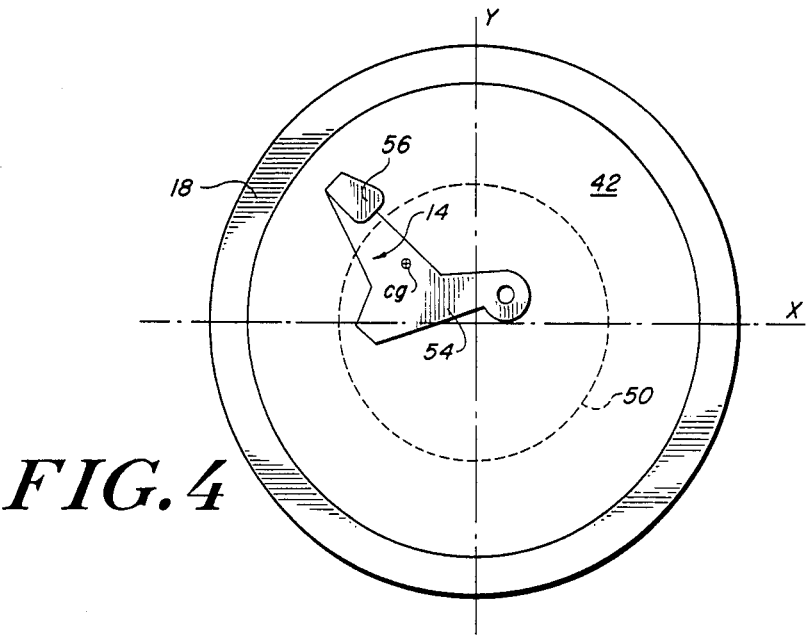
FIG. 4 is a plan view of the receptacle of FIG. 3 showing the part at the initial position.

As best shown in FIGS. 3 and 4, a randomly oriented part 14 deposited into receptacle 18 prior to vibration will slide over surface 42 and reach an initial position where it is supported on surface 42 but not necessarily lying wholly within the designated area 50 and/or being located in an equilibrium or stabilized position wherein the center of gravity of the part is as low as it could be.

The illustrated part 14 is a representative example of a typical small molded plastic piece-part that would be deposited in receptacle 18 for X-Y positioning and angular orientation. It comprises an irregularly shaped flat base section 54 having an integrally formed upstanding tab 56 on one end thereof. The center of gravity of the part, designated c.g. in the drawings, is located in a more or less central portion of the flat base section 54. In the illustrated initial position, before vibration of receptacle 18, the base section 54 is tilted with respect to horizontal plane 52. The center of gravity is higher than the horizontal plane 52 and is offset radially to the left of the central vertical axis 24. Also the tab portion of the part lies outside the designated area 50.

Figure 6:
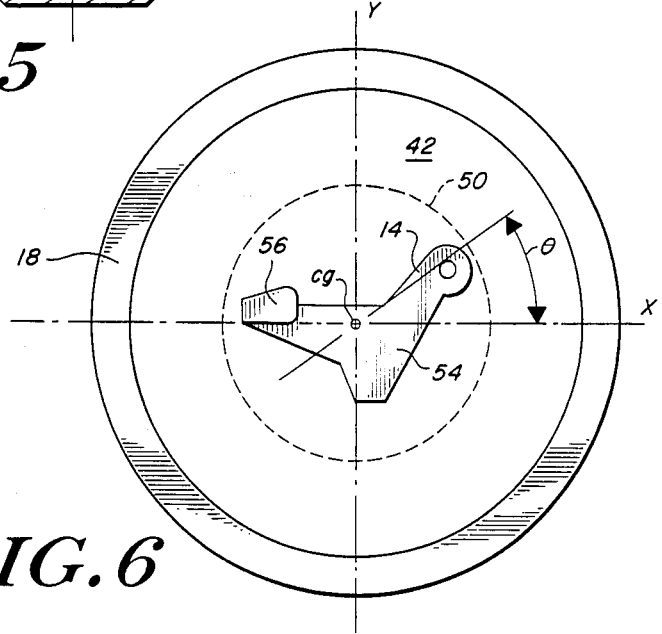
FIG. 6 is a plan view of the receptacle of FIG. 5 showing the part in its desired position and angular orientation for pick up.

However, by vibrating receptacle 18, preferably for a duration in the range of 0.5 to 3 seconds and, more typically for approximately 1 to 2 seconds, the frictional forces are reduced and part 14 slides to the right over surface 42 and moves to the equilibrium position shown in FIGS. 5 and 6. When so located, part 14 lies within designated area 50, and the flat base section 54 is substantially horizontal in plane 52 to locate the center of gravity at its lowest position wherein it is also centered over or aligned with the vertical axis 24.

As a general rule, the center of gravity of a part that has settled into an equilibrium position will be centered over or aligned with the central vertical axis 24 of receptacle 18. However it is possible that a part having a more complex three dimensional shape than the illustrated part 14 may settle into an equilibrium position wherein the center of gravity is at the lowest possible position in receptacle 18 but is displaced radially a predetermined distance away from the vertical axis 24.

Once the part 18 is positioned in the designated area 50 of the horizontal plane 52, the angular orientation $\theta$ of the part is observed by the vision system. If the part does not have the correct angular orientation or direction for pick up (as shown in FIG. 4), receptacle 18 is rotated about axis 24 to turn the part until it is correctly oriented at a desired angle as shown in FIG. 6.

In a typical installation of apparatus 10, the image of a part in receptacle 18 provided by video camera 34 is compared with a stored image, template, or silhouette mask of a part 14 having the correct or desired angular orientation for pick up. The comparison information is processed by control system 36. If the comparison information indicates the part is not correctly angularly oriented, control system 36 causes the motor 26 to be energized for turning the receptacle about axis 24. As the angular orientation of part 14 changes in response to turning receptacle 18, the comparison information is updated until it indicates that there is a match. Then, control system 36 causes the motor to be deenergized to stop the rotation of receptacle 18.

Now that the part 14 is in the desired angular orientation, control system 36 actuates the operation of robotic arm 16, or signals a host computer that operates arm 16, which reaches into the receptacle 18, picks up the part 14 located at the pick up position, and then transfers it to the product assembly area 17.

As noted earlier, if part part 14 is asymmetrical, there is a possibility that it may assume an equilibrium position wherein it is upside down (as shown in dotted lines in FIG. 3) or otherwise incorrectly oriented following vibration of the receptacle 18. This condition will be detected by the vision system which will provide signals to controller 36 indicating that the part does not meet the predetermined position and orientation criteria for pick up and transfer to the assembly area 17.

In this case, controller 36 automatically switches to a remedial action program wherein the receptacle 18 is turned to an alternative predetermined angular orientation $\theta$ that will allow the robotic arm 16 to pick up the part.

The remedial action program may be designed to have the robotic arm 16 remove the part 14 from receptacle 18 and place it in a rejected part receptacle for later recycling, or the part 14 may be reoriented to its correct orientation for assembly by having the robotic arm 16 transfer it to the optional reorientation device 38.

The particular shape of a given asymmetrical part 14 will determine how many different equilibrium positions or stabilized states it may assume in receptacle 18. Some parts 14 will have only two stabilized states, rightside up and upside down. Other parts having more complex shapes possibly may assume four or five different equilibrium positions. However, it has been observed that a given part will assume fewer different stabilized states in the bowl-like receptacle 18 than on a flat supporting surface thereby reducing the complexity of the remedial action program.

The number of different equilibrium positions that a given part will assume can be determined by empirical testing and then the appropriate remedial steps for each state may be incorporated into the remedial action program.

If the part has only two equilibrium positions, rightside up or upside down, reorientation may be achieved by turning the part over or rotating it through 180° about a horizontal axis of rotation. In this case, when the vision system indicates that part 14 is upside down, controller 36, utilizing the remedial action program, causes the receptacle 18 to rotate and locate the part 14 at an alternative angular orientation for pick up. Robotic arm 16 picks up the part 14 and transfers it to the gripping jaws 58 of device 38. Controller 36 then operates device 38 to rotate the jaws 58 through 180° about horizontal axis 60 thereby turning the upside down part 14 to its rightside up position. Then, robotic arm 16 retrieves the part 14 from device 38 and transfers it to the product assembly area 17. For parts 14 that can assume more than two equilibrium positions the remedial action program includes additional alternative angular orientations for pick up and transfer to device 38, and corresponding different angles of remedial rotation about axis 60 to place the part in its proper orientation for transfer to the assembly area 17 by the robotic arm 16.

The part positioning apparatus 10 embodying the present invention is generic in nature in that it will accommodate a variety of different shaped parts without having to make mechanical modifications to receptacle 18. Switching from one part to another may be accomplished by providing the vision system with an appropriate mask or template for a given part and modifying the software that runs controller 36 to accommodate the particular characteristics of the part. With regard to adapting the operation of receptacle 18 to a particular part, the only change that may be necessary is adjusting the amplitude and duration of the applied vibratory force for optimized performance.

While apparatus 10 has been described as including a single bowl-shaped receptacle 18 fixedly mounted on base unit 20, it is within the scope of the present invention to provide apparatus 10 with a set of different receptacles 18 that vary in size and/or the shape of interior concave surface 42, and which may be interchangeably mounted on base unit 20 to accommodate a wider variety of different parts.

Since certain other changes or modifications may be made in the above described part positioning apparatus and method without departing from the spirit and scope of the invention involved herein, it is intended that all matter contained in the above description or shown in the accompanying drawings be interpreted as illustrative and not in a limiting sense.

What is claimed is:

1. A part positioning apparatus for locating a part within a designated area of a horizontal plane and for, thereafter, rotating the part about a vertical axis centered in the designated area to angularly orient the part in a desired direction; said part positioning apparatus comprising:

a hollow bowl-like part receptacle disposed so that the designated area of the horizontal plane is centered therein, said receptacle including an upwardly facing interior concave, curved part supporting surface having a shape or a surface of revolution formed by rotating a generating curve segment about said vertical axis and over which a part placed thereon will tend to move, under the influence of gravity, downwardly and toward the center of said receptacle to seek an equilibrium position within the designated area, said curved surface making said receptacle usable with a variety of differently shaped parts;

means for vibrating said receptacle for a selected time to reduce frictional forces between said interior surface and the part thereon and thereby facilitate movement of the part to said equilibrium position; and means for selectively rotating said receptable about the vertical axis to angularly orient the part at said equilibrium position in the desired direction.

2. The part positioning apparatus of claim 1 wherein said generating curve is a segment of a circle.

3. The part positioning apparatus of claim 1 wherein said interior surface is a segment of a hemisphere.

4. The part positioning apparatus of claim 1 wherein said generating curve is a segment of a parabola.

5. The part positioning apparatus of claim 1 wherein said means for vibrating said receptacle is configured to apply a vibratory force to said receptacle directed along the vertical axis.

6. The part positioning apparatus of claim 1 further including means mounting said receptacle for rotation about the vertical axis and for linear vibratory motion in the direction of the vertical axis.

7. The part positioning apparatus of claim 1 wherein said receptacle is mounted for rotation about the vertical axis and said means for selectively rotating said receptacle include means for providing signals indicative of the angular orientation of a part at said equilibrium position and means responsive to said signals for rotating said receptacle to angularly orient the part in the desired direction.

8. The part positioning apparatus of claim 7 wherein said means for providing said signals includes an electronic vision system for converting an optical image of a part at said equilibrium position into electronic orientation signals.

9. The part positioning apparatus of claim 1 wherein the part is of the type that may assume more than one equilibrium position after vibration including at least one improper equilibrium position wherein the part cannot achieve the desired orientation by rotating the receptacle and said positioning apparatus further includes means for receiving such a part transferred thereto from said receptacle and for re-orienting the part into the desired orientation.

10. The part positioning apparatus of claim 9 wherein said part receiving and re-orienting means includes means for rotating the part through a selected angle about a horizontal axis.

11. The part positioning apparatus of claim 1 wherein said interior surface is shaped such that a part seeks an equilibrium position wherein the part is supported by said surface with the center of gravity of the part as low as possible.

12. Apparatus for positioning a piece-part in a predetermined orientation, said apparatus comprising:
a bowl-like receptacle defining an upwardly facing generally concave, curved surface disposed about a vertical axis and having a shape of a surface of revolution formed by rotating a generating curve segment about said vertical axis, and adapted to receive the piece-part thereon randomly disposed with respect to said vertical axis;
means for vibrating said receptacle to impart a sliding motion to the piece-part along said generally concave, curved surface until the center of gravity of the piece-part is disposed at its lowest-most possible position within said receptacle thereby locating said piece-part with its center of gravity in a predetermined horizontal plane and predeterminedly radially disposed with respect to said vertical axis, said curved surface making said receptacle usable with a variety of differently shaped parts; and
means for rotating said receptacle about said vertical axis to establish the desired predetermined angular orientation of the piece-part.

13. The apparatus of claim 12 wherein said generally concave surface is symmetrically disposed about said vertical axis.

14. A part positioning apparatus for locating a part within a designated area of a horizontal plane and for, thereafter, rotating the part about a vertical axis centered in the designated area to angularly orient the part in a desired direction, said part positioning apparatus comprising:
a hollow bowl-like part receptacle having a smooth upwardly facing concave, curved interior part supporting surface in the shape of a concave surface of revolution formed by rotating a generating curve segment about said vertical axis, said interior surface being configured so that a part placed thereon will tend to slide thereover, under the influence of gravity, downwardly and toward the center of said receptacle to seek an equilibrium position, said curved surface making said receptacle usable with a variety of differently shaped parts;
means mounting said receptacle for rotation about said vertical axis and for linear vibratory motion in the direction of said vertical axis, said mounting means being positioned to locate said receptacle such that the designated area of the horizontal plane is within said receptacle and is symmetrically disposed with respect to said vertical axis;
means for vibrating said receptacle in the direction of said vetical axis for a selected time to reduce frictional forces between said interior surface and the part thereon and thereby facilitate sliding movement of the part to said equilibrium position; and
means for selectively rotating said receptacle about said vertical axis to angularly orient the part at said equilibrium position in the desired direction.

15. The positioning apparatus of claim 14 wherein said concave surface is a surface of revolution generated by revolving a segment of a circle about said vertical axis.

16. A method of locating a part within a designated area of a horizontal plane and for, thereafter, rotating the part about a vertical axis centered in the designated area to angularly orient the part in a desired direction, said method comprising the steps of:
providing a hollow bowl-line part receptacle having an upwardly facing concave, curved interior part supporting surface having a shape of a surface or revolution formed by rotating a generating curve segment about said vertical axis over which a part placed thereon will tend to move, under the influence of gravity, downwardly and toward the center of said receptacle to seek an equilibrium position, said curved surface making said receptacle usable with a variety of differently shaped parts;
locating said receptacle so that said designated area of said horizontal plane is centered therein;
placing a part into said receptacle so said part is supported on said interior surface;
vibrating said receptacle for a selected time to reduce frictional forces between said interior surface and said part thereon and thereby facilitate movement of said part to said equilibrium position; and, thereafter,
selectively rotating said receptacle about said vertical axis to angularly orient said part in said equilibrium position in said desired direction.

17. The method of claim 16 wherein said receptacle is vibrated in the direction of said vertical axis.

* * * * *